US006997645B2

(12) United States Patent
von Trepka et al.

(10) Patent No.: US 6,997,645 B2
(45) Date of Patent: Feb. 14, 2006

(54) SUBSEA TOOL FOR TIE IN OF PIPELINE ENDS

(75) Inventors: Knut von Trepka, Oslo (NO); Sverre Caspersen, Oslo (NO)

(73) Assignee: Kvaerner Oilfield Products As, Lysaker (NO)

( * ) Notice: Subject to any disclaimer, the term of this patent is extended or adjusted under 35 U.S.C. 154(b) by 0 days.

(21) Appl. No.: 10/498,220

(22) PCT Filed: Dec. 10, 2002

(86) PCT No.: PCT/NO02/00473

§ 371 (c)(1), (2), (4) Date: Jul. 12, 2004

(87) PCT Pub. No.: WO03/050443

PCT Pub. Date: Jun. 19, 2003

(65) Prior Publication Data

US 2005/0063786 A1 Mar. 24, 2005

(30) Foreign Application Priority Data

Dec. 11, 2001 (NO) ................................. 20016058

(51) Int. Cl.
*F16L 1/26* (2006.01)

(52) U.S. Cl. ...................................... 405/170; 405/169

(58) Field of Classification Search ................ 405/169, 405/170, 158, 154.1, 184.4

See application file for complete search history.

(56) References Cited

U.S. PATENT DOCUMENTS

| | | | | |
|---|---|---|---|---|
| 4,019,334 | A | 4/1977 | Sinclair et al. | |
| 4,068,492 | A * | 1/1978 | Reneau | 405/170 |
| RE31,265 | E | 6/1983 | Sinclair et al. | |
| 4,525,101 | A * | 6/1985 | Stevens et al. | 405/169 |
| 5,730,551 | A * | 3/1998 | Skeels et al. | 405/170 |
| 5,975,803 | A | 11/1999 | Mackinnon | |
| 6,024,514 | A * | 2/2000 | Ostergaard | 405/170 |
| 6,227,765 | B1 * | 5/2001 | von Trepka | 405/170 |
| 6,234,717 | B1 * | 5/2001 | Corbetta | 405/170 |
| 6,742,963 | B1 * | 6/2004 | Bekkevold et al. | 405/170 |

FOREIGN PATENT DOCUMENTS

| | | |
|---|---|---|
| DE | 36 10836 A1 | 10/1987 |
| NO | 159555 B | 6/1986 |
| NO | 165653 B | 12/1990 |

* cited by examiner

*Primary Examiner*—Frederick L. Lagman
(74) *Attorney, Agent, or Firm*—Birch, Stewart, Kolasch & Birch, LLP

(57) ABSTRACT

A subsea tool (10) designed to pull pipeline ends (PE1, PE2) towards each other is disclosed. The tool (10) comprises a first and a second main body (1, 2) that are able to be displaced to and from each other and have limited freedom of motion relative to each other. The first main body (1) comprises a frame construction (5) having means **(11*b*) for guiding onto and fixed attachment to one of the pipeline ends (PE1). The second main body (2) comprises a frame structure (6) having means (18) for guiding onto and retaining the other pipeline end (PE2). A number of guiding means (15, 16) are provided on the first main body (1) for co-operation with complementary guiding elements (20, 21) provided on the second main body (2). A pulling device (3) is arranged between the first and second main body (1, 2) and is designed for pulling the main bodies (1, 2)** including the respective pipeline ends (PE1, PE2) towards each other.

5 Claims, 8 Drawing Sheets

SUBSEA TOOL FOR TIE IN OF PIPELINE ENDS

Figure 1:
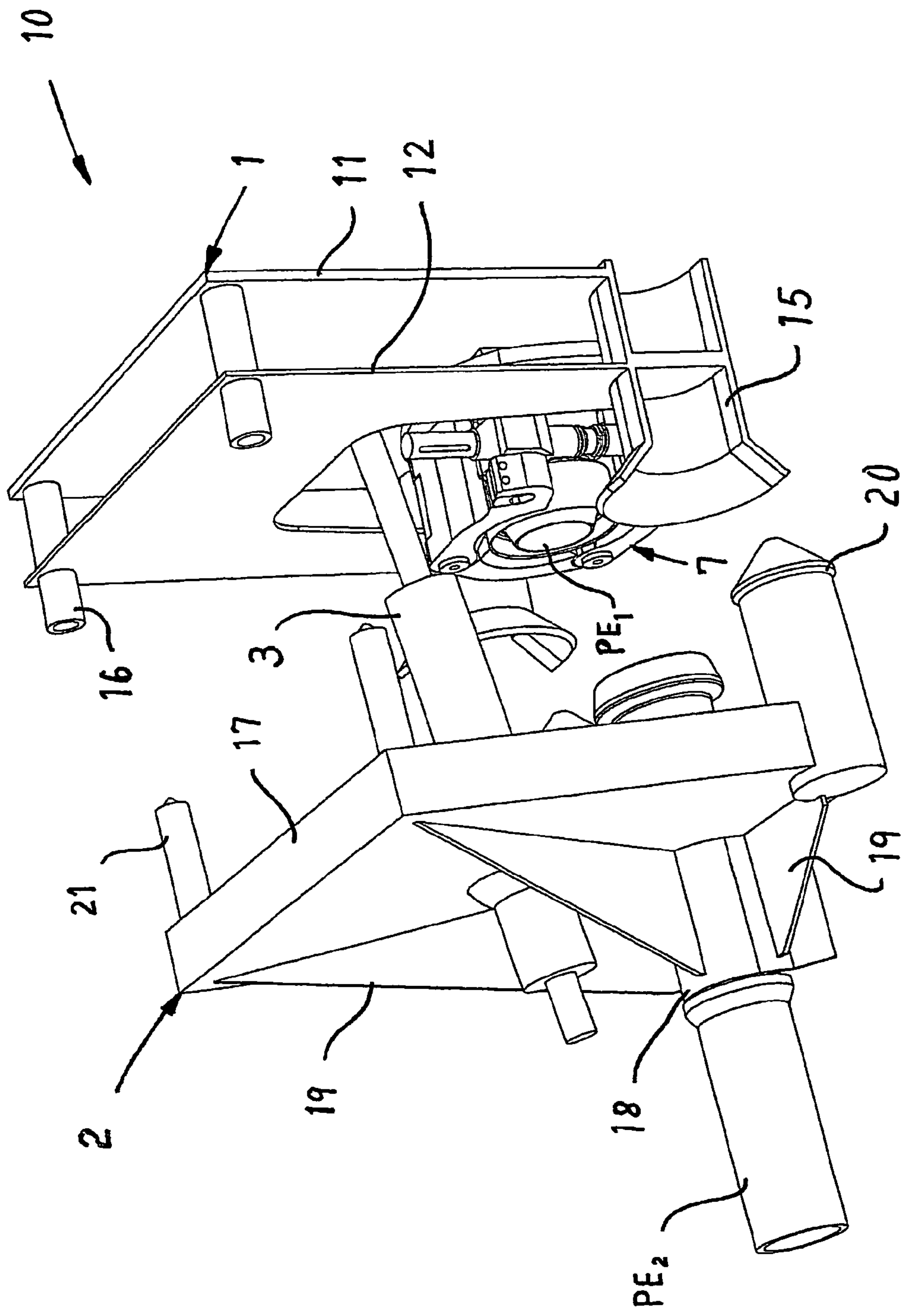

The present invention relates to a subsea tool designed to pull pipeline ends towards each other, which tool comprises a first and a second main body able to be displaced to and from each other.

When a pipeline, for transportation of such as oil and gas, is laid out on the seabed and is to be connected to a fixed coupling point, it has been common practise to use a tie-in and connecting tool, which is lowered from the sea surface. The tool is put down over the coupling point and a wire line is brought out from the tool and secured to the pipeline end that is to be tied in before the connecting operation can take place. When the pipeline ends, which have a respective flange, are brought against each other, the connecting operation takes place by means of a clamp connector. The clamp connector has internal bevelled surfaces, which co-operate with external bevelled surfaces on the pipeline flanges. When the clamp connector is activated the respective bevelled surface effects that the pipeline ends are pulled axially towards each other by substantial force and final connecting engagement takes place. This provides one coupling point on the seabed only.

Recently it has been more common practise to deploy the pipeline such that the pipeline end terminates well apart from the coupling point, for example by a distance of 30 meter. Then another pipeline is laid down in a loop, such as an expansion loop, between the coupling point and the end of the pipeline. Thus another coupling point is introduced which is not an advantage when considered alone. However, the advantage achieved is that a far smaller, simpler, lighter and thus less expensive tool is required to perform the pull-in of a pipeline end of this pipeline loop having limited length and weight. The previously described wire line bring-out and subsequent tie-in can be disregarded. As a precondition for the present subsea tool, the pipeline loop must still be manufactured and deployed with good precision, preferably so good that the pipeline ends terminate at a distance less than 150 mm apart from the connection points.

With the present subsea tool, that advantage is also achieved that the pipeline ends are positioned low in the tool and substantially where they shall be lying after the coupling engagement is completed.

One example of the prior art is disclosed in US Re. 31 265.

According to the present invention is a subsea tool of the introductorily described type provided, which is distinguished in that the first and the second main bodies have limited freedom of motion relative to each other, that the first main body comprises a frame construction having means for guiding onto and fixed attachment to one of the pipeline ends, that the second main body comprises a frame structure having means for guiding onto and retaining the other pipeline end, a number of guiding elements provided on the first main body for co-operation with complementary guiding elements provided on the second main body, and a pulling device arranged between the first and second main body, which pulling device is designed for pulling the main bodies including the respective pipeline ends towards each other at the same time as the guiding elements align and orient the pipeline ends relative to each other.

In a preferred embodiment the pipeline ends can have conical annular flanges where one pipeline end comprises an associated per se known clamp connector designed for final coupling engagement between the pipeline ends when these are brought against each other.

In a second embodiment the pipeline ends can have a respective standard flange having bolt connections in order to make final coupling engagement between the pipeline ends when these are brought against each other.

In order to provide the limited freedom of motion between the first and second main body, a preferable embodiment can, in addition to the pulling device, also include a yoke that is fixed to respective end portions of the pulling device and which is loosely supported in the frame construction and the frame structure respectively. The pulling device may conveniently be a linear motor, such as a working cylinder.

Figure 2B:
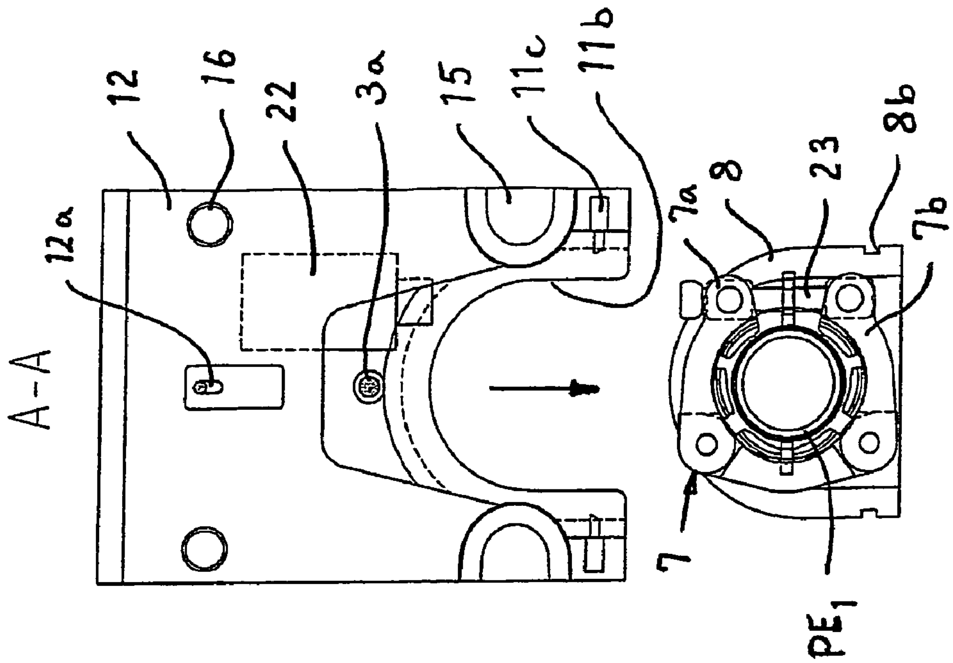
Figure 2A:
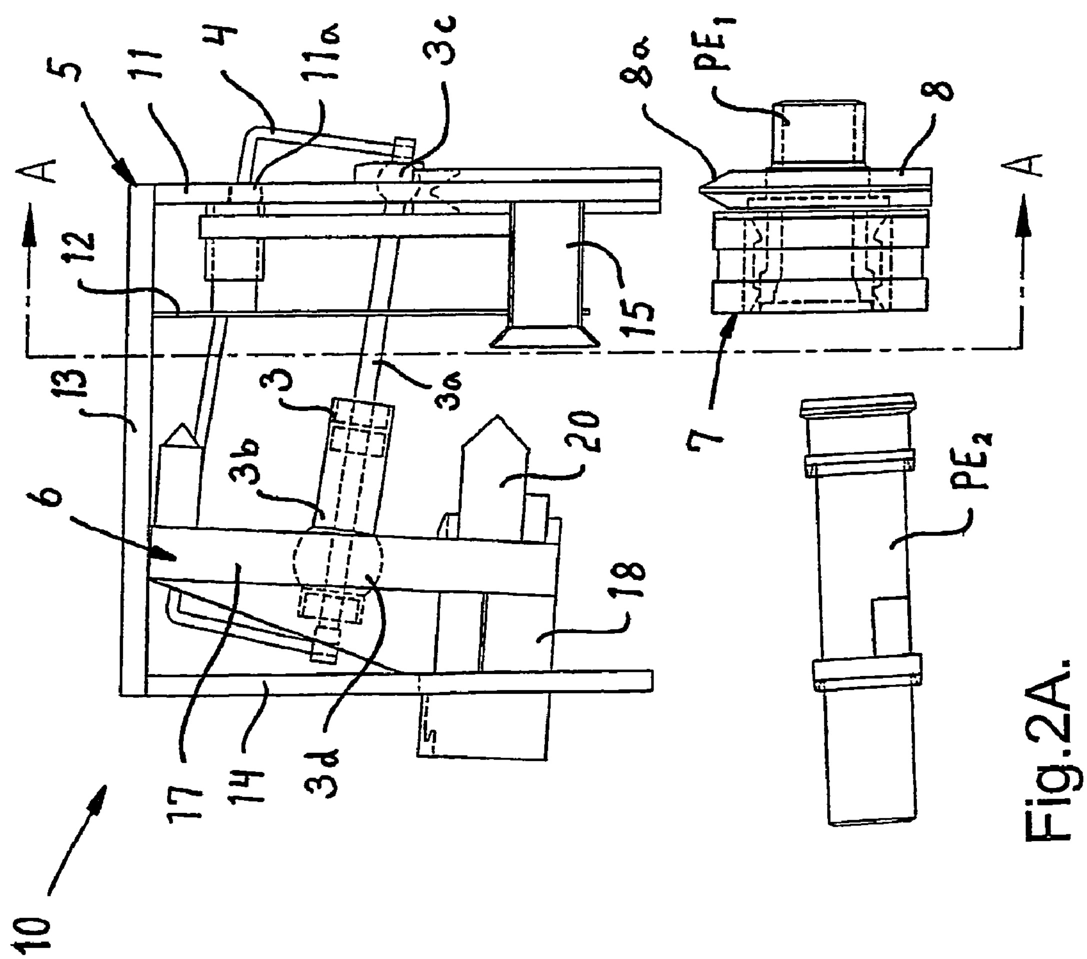
Figure 3A:
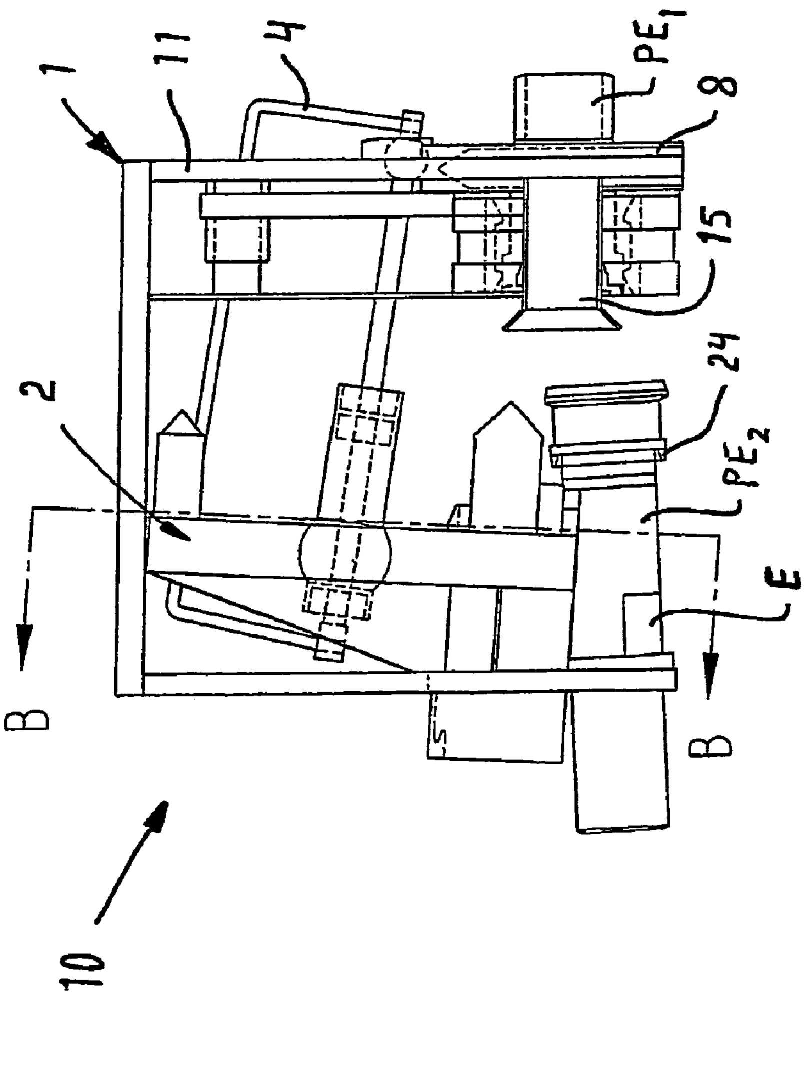
Figure 3B:
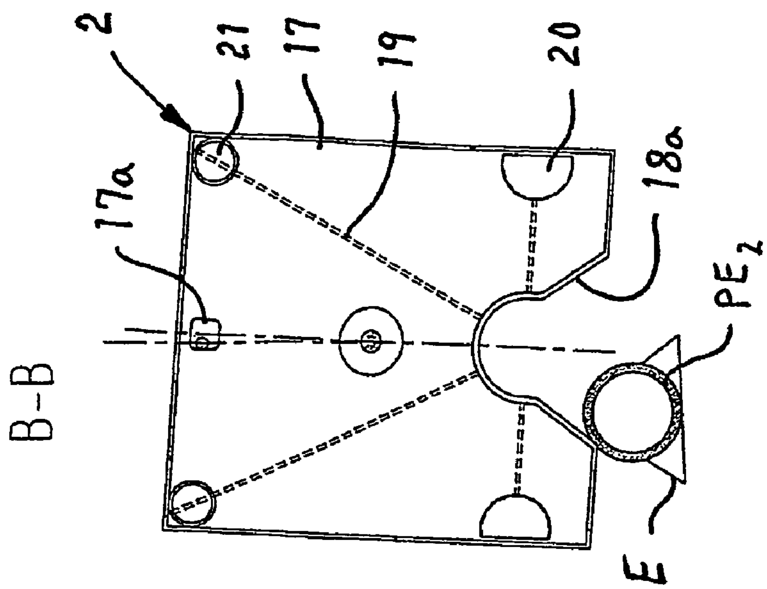
Figure 4B:
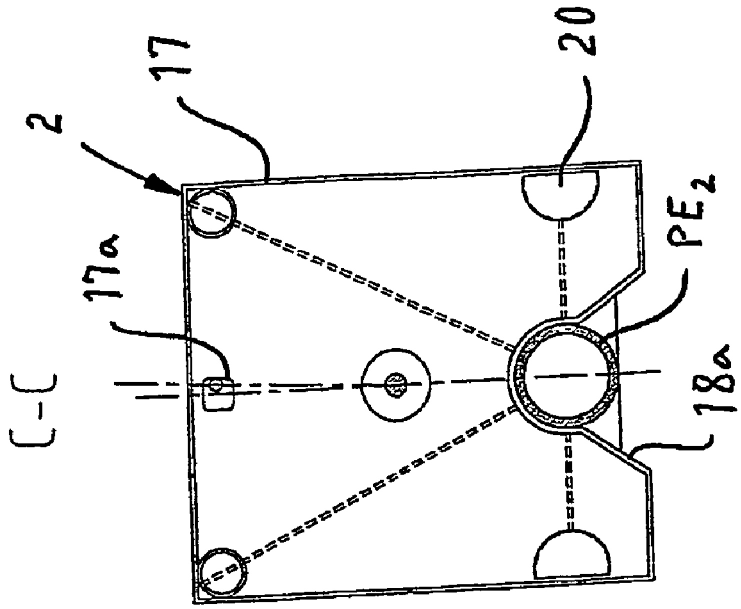
Figure 4A:
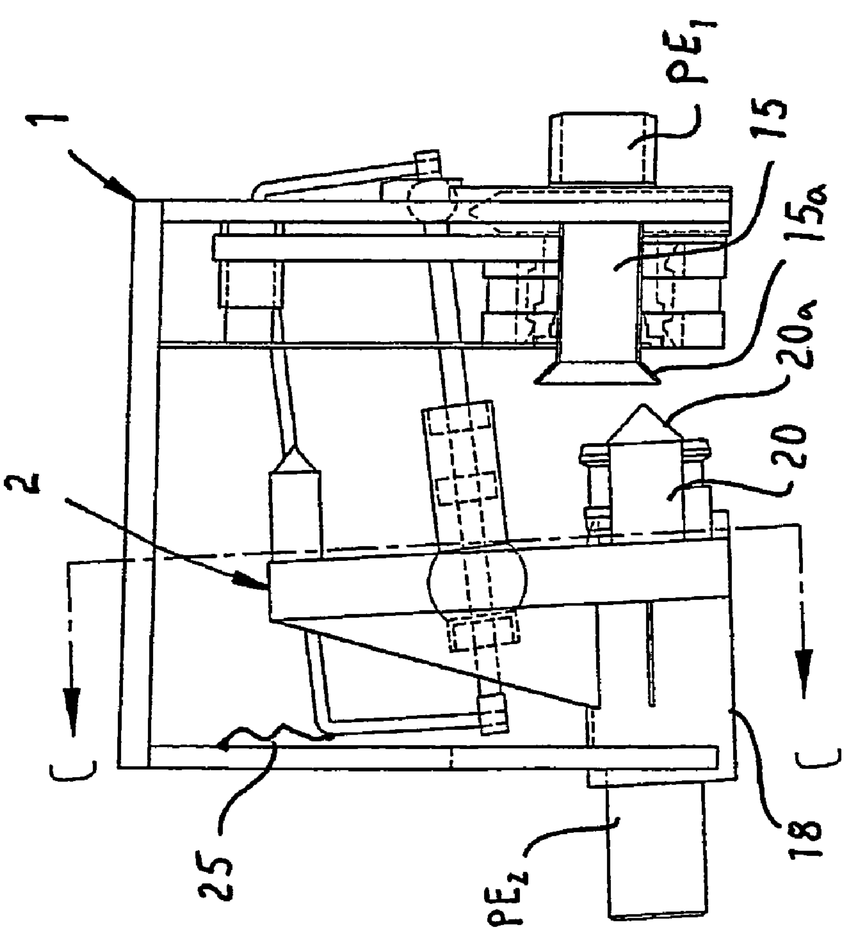
Figure 5B:
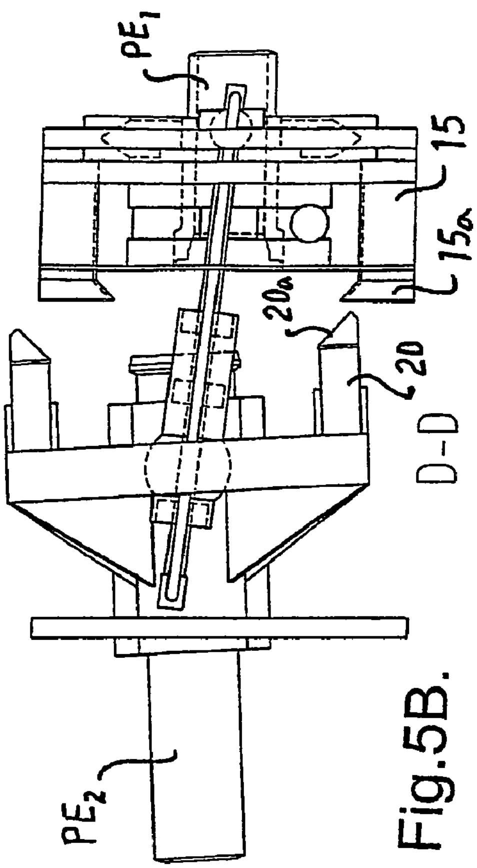
Figure 5C:
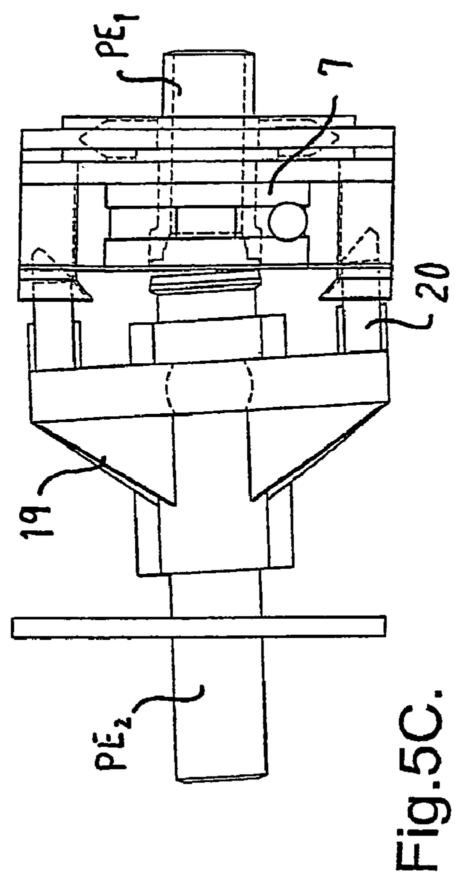
Figure 5A:
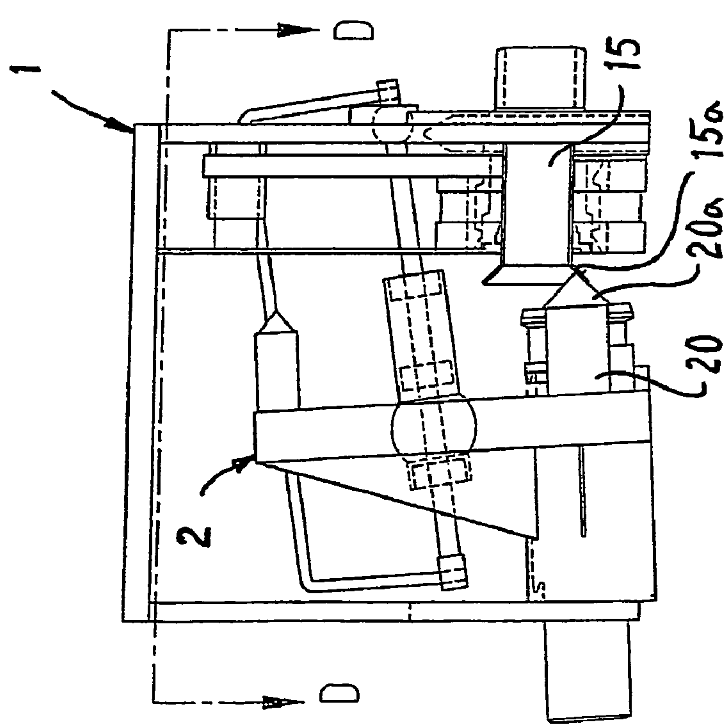
Figure 6B:
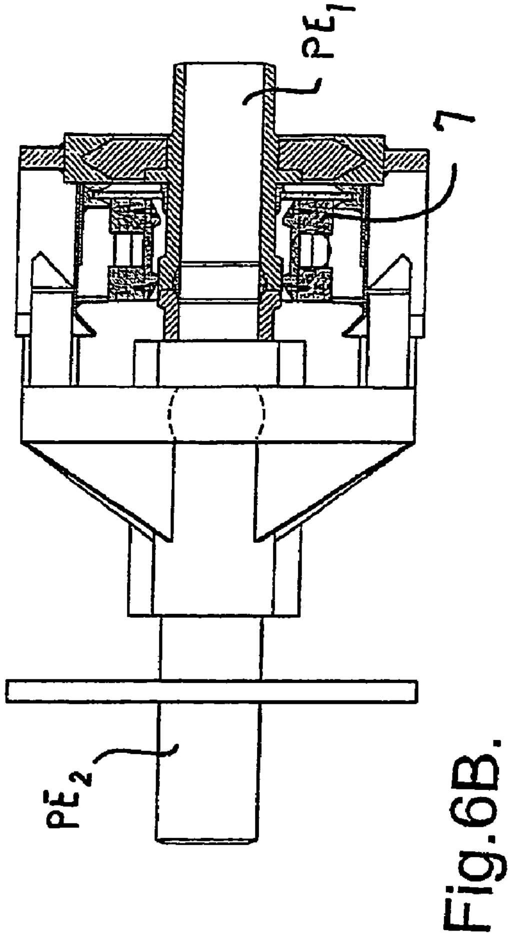
Figure 6C:
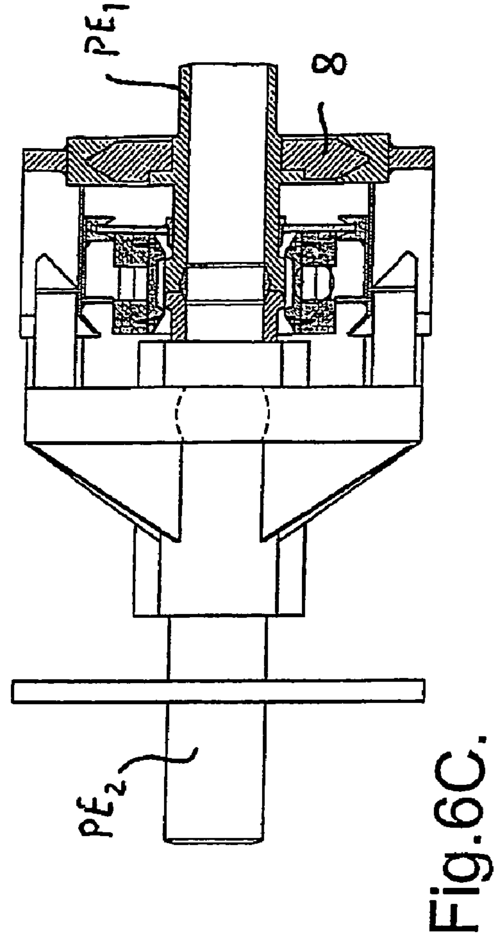
Figure 6A:
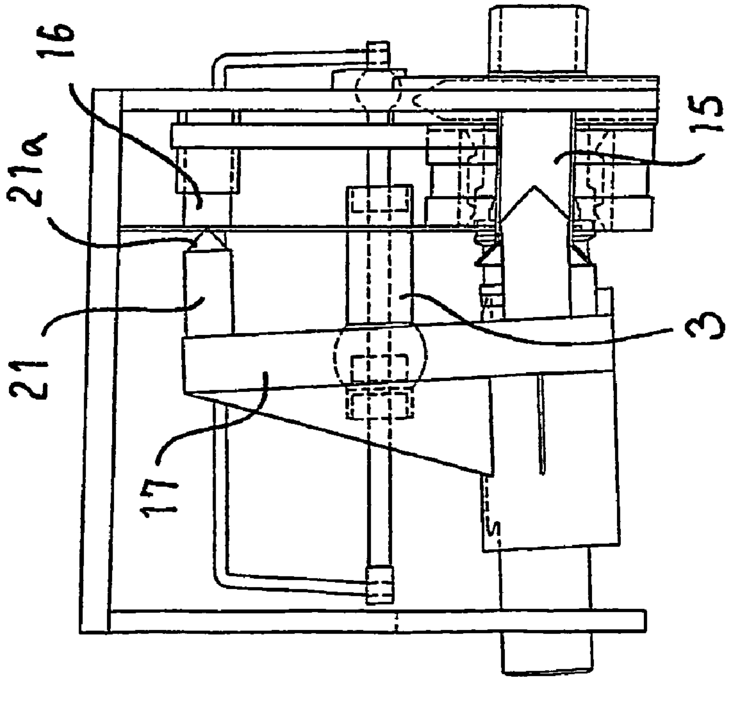
Figure 7B:
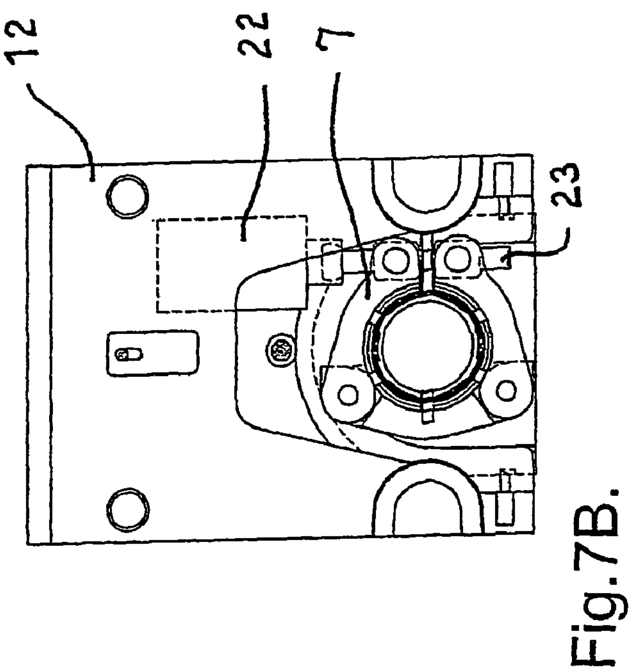
Figure 7C:
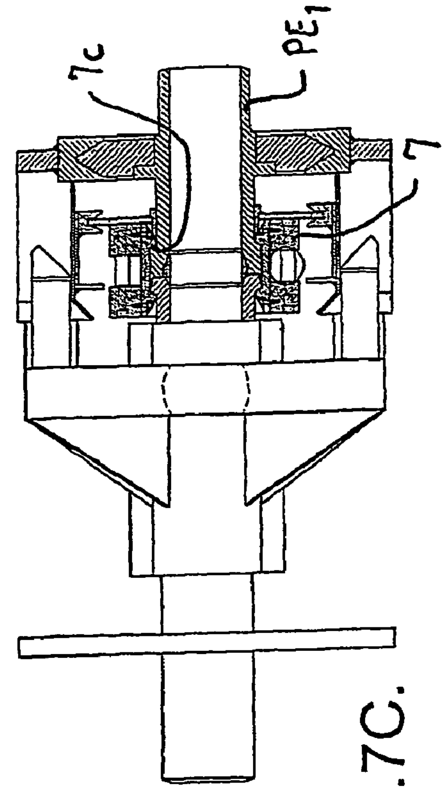
Figure 7A:
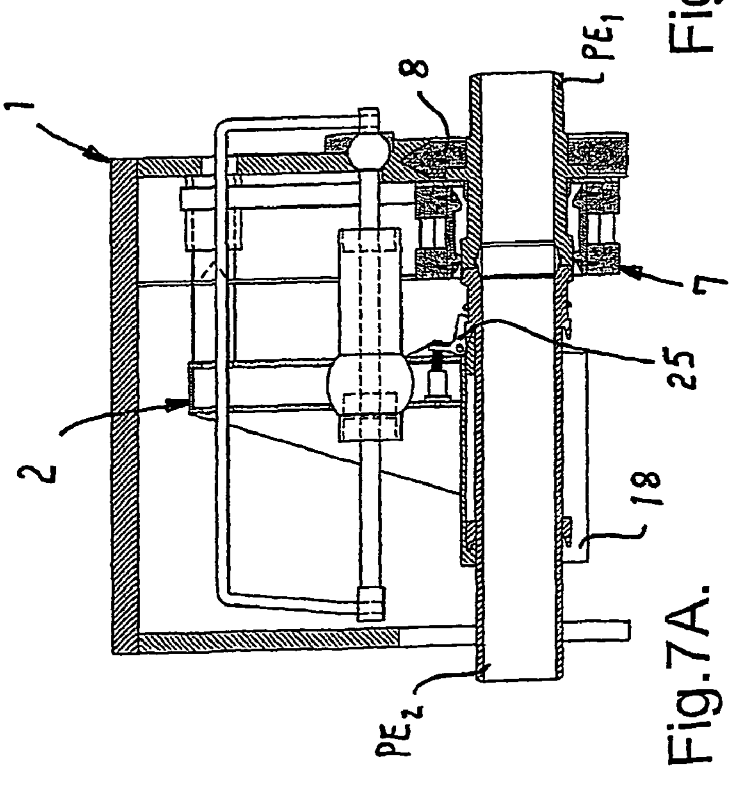
Figure 9:
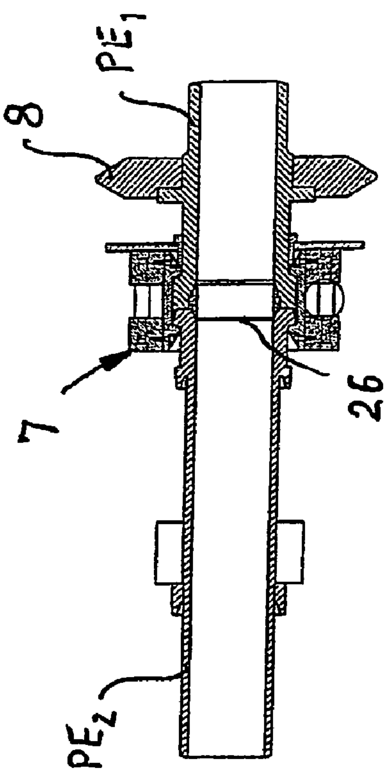
Figure 8:
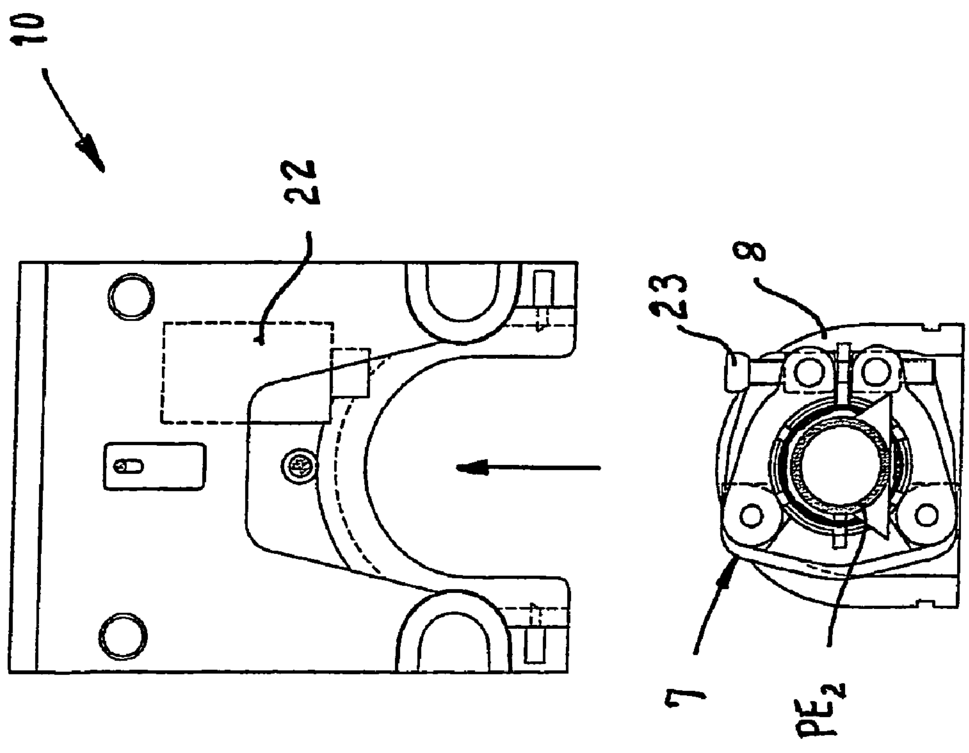

Other and further objects, features and advantages will appear from the following description of one for the time being preferred embodiment of the invention, which is given for the purpose of description, without thereby being limiting, and given in context with the appended drawings where:

FIG. 1 shows in perspective view the subsea tool according to the present invention, and is assembled of a first and a second main body having limited freedom of motion relative to each other, FIG. 2A shows an elevation view of the tool according to FIG. 1 during lead-down over two pipeline ends, which are to be pulled against each other, FIG. 2B shows a view in the direction of the arrow A—A in FIG. 2A, FIG. 3A–7A show elevation views of the tool according to FIG. 2A in subsequent steps during lead-down, pull-in and connecting operation, FIG. 3B shows a view in the direction of the arrow B—B in FIG. 3A, FIG. 4B shows a view in the direction of the arrow C—C in FIG. 4A, FIG. 5B, 5C, 6B, 6C, 7C show the tool in a view from above and viewed in the direction of the arrow D—D in FIG. 5A in subsequent steps during pull-in and connecting operation, FIG. 7B shows the tool in a view from left-hand end in FIG. 7A when the pipeline ends are pulled against each other, FIG. 8 shows the tool when it is released from the clamp connector and is about to be elevated to the surface, and FIG. 9 shows the pipeline ends and the clamp connector ready installed on the seabed.

Reference is first made to FIG. 1 that shows the main bodies of a tool 10 developed and designed with a view to pulling in of a second pipeline end $PE_2$ towards a first pipeline end $PE_1$ that are deployed on the seabed. In the figures are pipeline ends with conical flanges shown. However, it is to be understood that the tool in addition can be used to pull in pipeline ends having standard annular flanges, which are finally connected to each other by means of bolts and nuts. FIG. 1 has omitted to show an encompassing frame construction 5 to let the main bodies appear clearly in this perspective depiction. For the further description of the complete tool 10, reference is also made to FIG. 2A.

The subsea tool 10 is assembled of a first main body 1 and a second main body 2. The two main bodies 1, 2 are loosely interconnected via a pulling device in the form of a linear motor, such as a working cylinder 3, and a yoke 4 (not shown in FIG. 1). This loose interconnection affords the main bodies 1, 2 a limited freedom of motion in all directions relative to each other.

The first main body 1 includes a frame construction 5 made up of a back plate 11, a support plate 12, a top plate 13 and a front plate 14. The back plate 11, the support plate 12 and the front plate 14 are connected to and positioned substantially perpendicular to the top plate 13. A space is defined between the support plate 12 and the front plate 14. The second main body 2 is received in this space.

The second main body 2 includes a frame structure 6 comprising a carrier plate 17 having means 18 for receiving a pipeline end $PE_2$. The main body 2 has a number of braces 19 extending between the carrier plate 17 and the receiving means 18. The carrier plate 17 is positioned substantially perpendicular to the receiving means 18.

The support plate 12 is spaced some distance apart from the back plate 11. In addition to the connection via the top plate 13, the support plate 12 is connected to the back plate 11 via a lower pair of course positioning guiding means 15 and an upper pair of fine positioning guiding means 16.

Correspondingly the carrier plate 17 has a lower pair of elements 20 and an upper pair of elements 21 for complementary co-operation with the respective coarse positioning guiding means 15 and the fine positioning guiding means 16 on the frame construction 5. In the shown embodiment, the lower coarse positioning guiding means 15 is formed as semi pipe sockets terminating in semi funnels facing towards and designed to receive the lower elements 20. They are formed as halves since the pair together supplements each other and acts as if they were complete.

In the shown embodiment a clamp connector 7 is associated to the first main body 1. The clamp connector 7 embraces the first pipeline end $PE_1$.

FIG. 2A shows a situation where the tool 10 is lowered onto the two pipeline ends $PE_1$, $PE_2$, which are to be pulled towards each other for subsequent connection. A clamp connector 7 is already installed on the first pipeline end $PE_1$. A guiding device 8 having a configuration like a horseshoe, see FIG. 2B, is installed close to the clamp connector 7. The guiding device 8, having an outer, outwardly facing V-formed section 8*a*, is fixedly attached to the first pipeline end PEI. The back plate 11 has a recess 11*b* having a V-formed groove that is complementary to the horseshoe formed guiding device 8 and the section 8*a* The back plate 11 is guided on this guiding device 8 until the V-formed groove along the edge of the recess 11*b* makes secure engagement with the section 8*a* on the guiding device 8. Thus the first main body 1 of the tool 10 is fixedly retained in axial direction, and in rotation. In addition the back plate 11 has a pair of locking means 11*c* located on each side of the recess 11*b*. Each locking means is designed for engagement with respective notch 8*b* at each side of the guiding device 8. Thus the first main body 1 can also be retained against being pulled out.

As shown in FIG. 2A, the piston rod 3*a* of the working cylinder 3 is connected to the back plate 11 by means of a first joint 3*c*. A second joint 3*d* connects the other end 3*b* of the working cylinder 3 to the support plate 17 of the second main body 2. Due to the joints 3*c*, 3*d*, the second main body 2 is able to move in all directions relative to the first main body 1, yet within certain limits. Actuation of the working cylinder 3 will provide a compound motion, still mainly in axial direction of the pipeline end $PE_2$.

As also shown in FIG. 2A, a yoke 4 is arranged between the respective end portions of the working cylinder 3. The yoke 4 passes through an opening 11*a* in the back plate 11 and an opening 12*a* in the support plate 12. The openings 11*a* and 12*a* are somewhat longer than wide in order that the yoke 4 shall be able to perform a supported tilting motion in the openings 11*a*, 12*a*.

FIG. 2B shows a view in the direction of the arrow A—A in FIG. 2A and consequently towards the support plate 12. The clamp connector 7 embraces the pipeline end $PE_1$ and remains in inactivated mode. The clamp connector 7 can be made up by means of a motor 22 secured to the back plate 11, which motor 22 is connected to a screw 23 that the motor 22 is able to rotate. The screw 23 extends through one end of the upper arm 7*a* of the clamp connector 7 and through a threaded portion of the end of the lower arm 7*b* of the clamp connector 7. The clamp connector 7 is of per se known construction and will not be described in detail here.

FIG. 3A shows the first main body 1 when it is put down onto and in engagement with the section 8*a* of the guiding device 8. The guiding device 8 secures the first main body 1 both in axial direction and against rotation. The second main body 2 is about to locate itself over the second pipeline end $PE_2$. As it appears from FIG. 3B, showing a view in the direction of the arrow B—B in FIG. 3A, the receiving means 18 is configured with bevelled surfaces 18*a* that guide the pipeline end $PE_2$ into position within the receiving means 18. The pipeline end $PE_2$ may preferably have suitable profile elements E that secures the pipeline end $PE_2$ to the receiving means 18 with regard to rotation.

As shown in FIG. 3B, an opening 17*a* is also cut out in the carrier plate 17 through which the yoke 4 passes with substantial freedom of motion. For the yoke 4, the opening 17*a* has an analogous function as the opening 11*a* in the back plate 11.

In FIG. 4A, the second main body 2 is completely lowered down onto and embraces partly the second pipeline end $PE_2$. The receiving means 18 has internal grooves (not shown) that co-operate with one or more shoulders 24, see FIG. 3A, on the pipeline end $PE_2$. In this way the second main body 2 is able to axially bring along the pipeline end $PE_2$. The yoke 4 can be further restricted in its freedom of motion by means of a strap 25 or similar.

FIG. 4B shows the same situation as in FIG. 4A, but viewed in the direction of the arrow C—C in FIG. 4A. The pipeline end $PE_2$ is trapped within the receiving means 18, but as illustrated, the entire second main body 2 is able to tilt somewhat relative to the vertical line.

As illustrated in FIGS. 5A and 5B, it is not always the situation that one has been able to lay down the pipeline ends $PE_1$, $PE_2$ such that they are aligned. In stead they have been laid down having an angular deviation relative to each other. Angular deviation in all directions of about 3° and an offset in all directions between the axis of the pipeline ends of about 150 mm can be tolerated.

The alignment between the pipeline ends $PE_1$ and $PE_2$ takes place in that a pointed tip 20*a* of one of the lower elements 20 impinges the funnel formed guide 15*a* at the end portion of one of the respective coarse positioning guiding means 15. See FIG. 5A. By further translation of the second main body 2 towards the first main body 1, the lower elements 20 enter into the respective coarse-positioning guiding means 15 which brings the main bodies 1, 2 aligned in the vertical plane. See FIGS. 5B and 5C.

FIG. 6A shows the last step of the pull-in operation where a pointed tip 21*a* of the upper pair of elements 21 of the second main body 2 is about to impinge the respective fine positioning guiding means 16 of the first main body 1. FIG. 6B shows that the pipeline ends abuts, but they may still have an angular deviation in the horizontal plane. The working cylinder 3 has a line of action that is located in the area between the fine and coarse positioning guiding means 16, 15. This provides a basis for a moment to the carrier plate 17 about the coarse positioning guiding means 15. Thus, the upper pair of elements 21 will, by actuating the working cylinder 3, tilt towards the fine positioning guiding means 16 until the tips 21*a* engage and fine position the carrier plate 17 and thereby the second pipeline end $PE_2$ relative to the first pipeline end $PE_1$. The final positioning in the vertical and horizontal plane, i.e. when the pipeline ends $PE_1$, $PE_2$ are aligned and abut each other, is achieved when a firm abutment of the tips 21*a* against the fine positioning guiding means 16 is established. FIG. 6B also shows that the clamp connector 7 still remains in its initial open standby position.

FIG. 6C shows the clamp connector 7 translated in its open standby position over the conical faces of the pipeline flanges and ready for the final connecting and engaging operation.

FIG. 7A shows in closer detail the final position of the pipeline ends $PE_1$, $PE_2$ where the pipeline flanges are abutting each other, but before the clamp connector 7 is translated. In FIG. 7B and FIG. 7C the clamp connector 7 is displaced along the pipeline end $PE_1$ away from the guiding device 8 and towards the second pipeline end $PE_2$. The clamp connector 7 is displaced so far that it embraces both of the conical pipeline flanges of the respective pipeline ends $PE_1$, $PE_2$. The clamp connector 7 is contracting around the pipeline flanges by rotating the screw 23 by means of the motor 22. As shown, the clamp connector 7 has internal bevelled surfaces 7*c* that co-operate with the respective conical surfaces of the pipeline flanges. When the motor 22 rotates the screw 23, the respective arms 7*a*, 7*b* are pulled together and the internal wedge acting bevelled faces will pull the conical pipeline flanges towards each other with huge axial force. The figure also shows a pawl mechanism 25 that retains the second pipeline end $PE_2$ in firm engagement with the receiving means 18.

As it appears from FIG. 8, the clamp connector 7 remains on the seabed as a permanent coupling between the pipeline ends $PE_1$, $PE_2$. The subsea tool 10 can be released from the pipeline ends $PE_1$, $PE_2$ by actuating the pawl mechanism 25 so that the mechanism loosens the engagement with the second pipeline end $PE_2$. Simultaneously the locking means 11*c* is actuated to release from the notches 8*c* in the guiding device 8. Now the entire subsea tool 10 can be elevated to the surface and be reused for a later connecting operation.

FIG. 9 shows the completed coupling between the pipeline ends $PE_1$, $PE_2$ like it will be lying on the seabed. An internal sealing element 26 can preferably be provided between the pipeline flanges. The guiding device 8 and the clamp connector 7 remain on the coupling and may be used again at a later occasion if the coupling is to be released.

What is claimed is:

1. A subsea tool (10) designed to pull pipeline ends ($PE_1$, $PE_2$) towards each other, which tool (10) comprises a first and a second main body (1, 2) able to be displaced to and from each other, characterised in that the first and the second main bodies (1, 2) have limited freedom of motion relative to each other, that the first main body (1) comprises a frame construction (5) having means (11*b*) for guiding onto and fixed attachment to one of the pipeline ends ($PE_1$), that the second main body (2) comprises a frame structure (6) having means (18) for guiding onto and retaining the other pipeline end ($PE_2$), a number of guiding means (15, 16) provided on the first main body (1) for co-operation with complementary guiding elements (20, 21) provided on the second main body (2), and a pulling device (3) arranged between the first and second main body (1, 2), which pulling device (3) is designed for pulling the main bodies (1, 2) including the respective pipeline ends ($PE_1$, $PE_2$) towards each other at the same time as the guiding means and elements (15, 16, 20, 21) align and orient the pipeline ends ($PE_1$, $PE_2$) relative to each other.

2. The subsea tool according to claim 1, characterised in that the pipeline ends ($PE_1$, $PE_2$) comprise conical annular flanges where one pipeline end ($PE_1$) comprises an associated per se known clamp connector (7) designed for final coupling engagement between the pipeline ends ($PE_1$, $PE_2$) when these are brought against each other.

3. The subsea tool according to claim 1, characterised in that the pipeline ends ($PE_1$, $PE_2$) comprise respective standard flanges having associated bolt connections for performing final coupling engagement between the pipeline ends ($PE_1$, $PE_2$) when these are brought against each other.

4. The subsea tool according to one of the claims 1–3, characterised in that a yoke (4) is fixed to respective end portions of the pulling device (3) and is loosely supported in the frame construction (5) and the frame structure (6) respectively, said yoke (4) and the pulling device (3) provide the limited freedom of motion between the first and second main body (1, 2).

5. The subsea tool according to claim 4, characterised in that the pulling device is a working cylinder (3) that is articulated secured to the first and second main body (1, 2).

* * * * *